United States Patent
Beichl et al.

(10) Patent No.: US 7,644,928 B2
(45) Date of Patent: Jan. 12, 2010

(54) BRUSH SEAL

(75) Inventors: Stefan Beichl, Herrsching (DE); Alfons Gail, Friedberg (DE); Thomas Huppertz, Schwabhausen (DE)

(73) Assignee: MTU Aero Engines GmbH, Munich (DE)

( * ) Notice: Subject to any disclaimer, the term of this patent is extended or adjusted under 35 U.S.C. 154(b) by 903 days.

(21) Appl. No.: 10/919,898

(22) Filed: Aug. 17, 2004

(65) Prior Publication Data

US 2005/0040602 A1 Feb. 24, 2005

(30) Foreign Application Priority Data

Aug. 18, 2003 (DE) .................. 103 37 867

(51) Int. Cl.
*F16J 15/44* (2006.01)
(52) U.S. Cl. ..................................... 277/355
(58) Field of Classification Search ................. 277/355
See application file for complete search history.

(56) References Cited

U.S. PATENT DOCUMENTS

| 4,358,120 A | * | 11/1982 | Moore ......................... 277/355 |
| 4,541,741 A | * | 9/1985 | Woodbridge et al. ........ 384/482 |
| 4,600,202 A | * | 7/1986 | Schaeffler et al. ............ 277/355 |
| 4,678,113 A | * | 7/1987 | Bridges et al. ............... 228/160 |
| 5,090,710 A | * | 2/1992 | Flower ........................ 277/355 |
| 5,135,237 A | * | 8/1992 | Flower ........................ 277/355 |
| 5,308,088 A | * | 5/1994 | Atkinson et al. ............. 277/355 |
| 6,267,381 B1 | * | 7/2001 | Wright ........................ 277/355 |
| 6,343,792 B1 | * | 2/2002 | Shinohara et al. ........... 277/355 |
| 6,390,476 B1 | | 5/2002 | Tong et al. ................... 277/355 |
| 6,406,027 B1 | * | 6/2002 | Aksit et al. .................. 277/355 |
| 6,464,230 B1 | * | 10/2002 | Tong et al. ................... 277/355 |
| 6,695,314 B1 | | 2/2004 | Gail et al. .................... 277/355 |
| 2001/0030397 A1 | * | 10/2001 | Beichl ......................... 277/355 |
| 2002/0020968 A1 | | 2/2002 | Gail et al. .................... 277/355 |

FOREIGN PATENT DOCUMENTS

| DE | 10018273 | 10/2001 |
| DE | 19962316 | 7/2002 |
| EP | 1 353 097 | 10/2003 |
| FR | 2 824 378 | 11/2002 |
| WO | WO 01/48887 | 7/2001 |

* cited by examiner

*Primary Examiner*—Vishal Patel
(74) *Attorney, Agent, or Firm*—Davidson, Davidson & Kappel, LLC

(57) ABSTRACT

A brush seal has a bristle housing formed by a cover element and a support element. A plurality of bristles, which are wound around a core element and secured to the core element by a clamping element are positioned in the bristle housing. At least one of the support element and the cover element of the bristle housing are made of plastic.

4 Claims, 2 Drawing Sheets

BRUSH SEAL

Priority is claimed to German Patent Application No. DE 103 37 867.7, filed on Aug. 18, 2003, the entire disclosure of which is incorporated by reference therein.

The present invention relates to a brush seal for providing a non-hermetic seal, in particular between a stator and a rotor, having a bristle housing.

BACKGROUND

There are many applications in which two parts, namely a stator and a rotor, which rotate against one another, are to be sealed non-hermetically against one another. Such an application is, for example, sealing of an annular gap between the stator and rotor of a hydraulic machine, a gas turbine in particular, with a gas flowing through the gap. Brush seals are known in the related art for non-hermetic sealing of annular gaps between two components rotating with respect to one another. For example, German Patent Document DE 199 62 316 C2, related to U.S. Pat. No. 6,695,314, both of which are incorporated by reference herein describes brush seals. Likewise, German Patent Document DE 100 18 273 A1, related to United States Patent Application Publication No. 2002/0020968, both of which are incorporated by reference herein, also describes brush seals.

In the above brush seals known from the related art, the brush seal is formed by several bristles wound around a core element and secured to the core element by a clamp ring. The unit composed of clamp ring, core element and bristles, which forms the actual brush seal, is situated in a bristle housing, which is formed by a support element designed as a support ring and a cover element designed as a cover ring.

Free ends of the bristles run against the sealing surface of the rotor or of the stator and thus seal the annular gap between the rotor and stator. The bristles of the brush seal may be oriented in the direction of rotation of the rotor to make soft, radial deflection of the bristles in contact with the rotor possible.

In the brush seals known from the related art, the support element, the cover element, and the unit composed of the clamp ring, core element, and bristles are made of metal. The metallic support elements and cover elements are typically designed as deep-drawn sheet metal or as turned parts. According to the related art, the metallic support element and the metallic cover element are usually connected by crimping to form the bristle housing. Brush seals made of metal are heavy in weight and relatively expensive to manufacture.

SUMMARY OF THE INVENTION

Based on the related art, an object of the present invention is to provide a novel brush seal.

The present invention provides a brush seal for providing a non-hermetic seal, in particular between a stator (13) and a rotor (12), having a bristle housing (19) which has a cover element (22) and a support element (23), wherein the support element (23) and/or the cover element (22) of the bristle housing (19) is made of plastic.

At least the support element and/or the cover element of the bristle housing is/are made of plastic according to the present invention. This offers the advantage of reduced weight compared to a metallic support element and cover element. Furthermore, support elements and cover elements made of plastic are easier to join than support elements and cover elements made of metal. This allows brush seals to be manufactured more cost-effectively.

According to an advantageous refinement of the present invention, at least the support element and the cover element of the bristle housing are designed as injection-molded plastic (optionally laminated). Even asymmetric geometries having complex three-dimensional shapes are easily manufactured in injection-molded parts.

The core element is also preferably manufactured of plastic. This has proven to be particularly advantageous and cost-effective in combination with a support element and cover element made of plastic.

Preferred refinements of the present invention result from the claims and the description that follows.

BRIEF DESCRIPTION OF THE DRAWINGS

Exemplary embodiments of the present invention are elucidated in more detail, without constituting a restriction to said invention, with reference to the drawings, in which.

DETAILED DESCRIPTION

Figure 1:
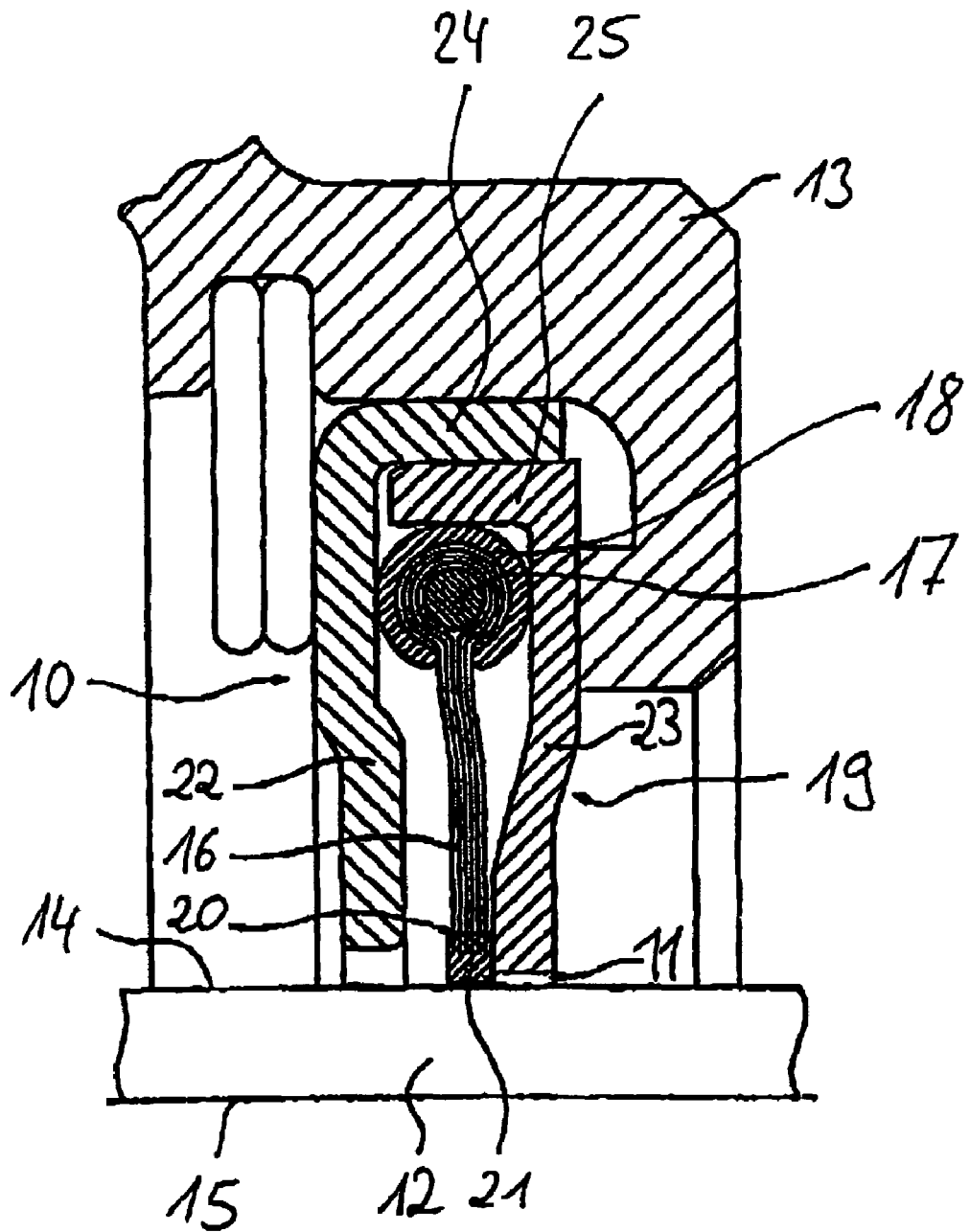
FIG. 1 shows the brush seal of the present invention according to a first exemplary embodiment.

FIG. 1 shows a schematic cross-sectional view of a first exemplary embodiment of brush seal 10 of the present invention. Brush seal 10 is used for sealing a gap 11 between a rotor 12 and a stationary stator 13. In FIG. 1, a peripheral surface of rotor 12 is designated by reference number 14 and a central axis of the same by reference number 15. Such brush seals 10 are used, for example, in stationary gas turbines and aircraft propulsion units.

Brush seal 10 has a plurality of bristles 16. Bristles 16 are wound around a wire-shaped core element 17 having a round cross section and secured to core element 17 by a clamping element 18. Clamping element 18 has a C-shaped cross section.

The unit composed of bristles 16, core element 17, and clamping element 18 is situated in a bristle housing 19. In the exemplary embodiment shown, bristles 16 are essentially made of steel, each bristle forming an essentially straight line oriented radially with respect to rotor 12. In the exemplary embodiment of FIG. 1, a sliding ring 21 is associated with free ends 20 of bristles 16, sliding ring 21 being used to optimize the sealing effect and the wear properties of bristles 16.

As mentioned previously, the unit composed of bristles 16, core element 17, and clamping element 18 is situated in bristle housing 19. Bristle housing 19 is formed by a cover element 22 designed as a cover plate and a support element 23 designed as a support plate. Different pressures prevail on either side of brush seal 10, support element 23 being situated on the low-pressure side and cover element 22 being situated on the high-pressure side.

According to the present invention, cover element 22 and support element 23 are made of plastic. Particularly advantageous is a design of cover element 22 and support element 23 as injection-molded plastic parts. Compared to the metallic design known from the related art, weight and cost advantages result from an embodiment of cover element 22 and support element 23 made of plastic. Thus, cover elements and support elements made of plastic are more lightweight than cover elements and support elements made of metal. Furthermore, the expensive manufacturing procedures used for metallic cover elements and support elements are no longer needed. Injection-molded plastic parts are manufacturable in a cost-effective way. Furthermore, it is possible to join cover element 22 to support element 23 in a cost-effective manner to form bristle housing 19.

Thus, to form bristle housing 19 according to a preferred refinement of the present invention, sections 24 and 25 of cover element 22 and support element 23, running essentially axially, are glued together. An adhesive bond between plastic cover element 22 and plastic support element 23 is implementable in a simple and cost-effective way.

According to a second, alternative preferred refinement of the present invention, plastic cover element 22 and plastic support element 23 are locked, i.e., snapped together, to form brush housing 19. This is implementable, for example, by integrating a counterhook-type locking element, i.e., anchoring element in essentially axial section 24 of cover element 22, the locking element engaging, i.e., snapping into, a matching recess of axial section 25 of support element 23. Alternatively, however, it is also possible to integrate the counterhook-type locking element into section 25 of support element 23 and the corresponding recess into section 24 of cover element 22. In this way, cover element 22 and support element 23 may be joined together in a simple and cost-effective way.

Figure 2:
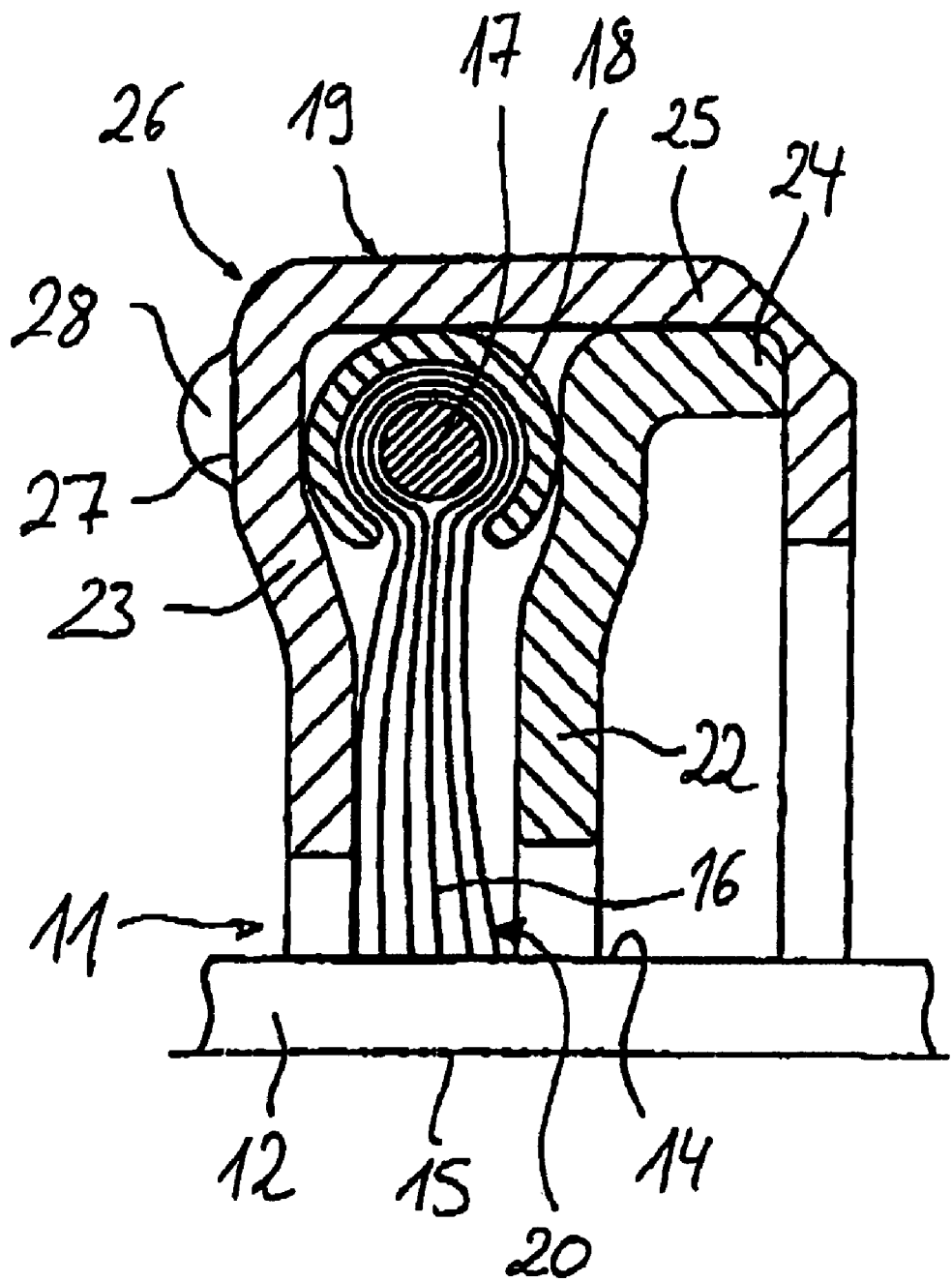
FIG. 2 shows the brush seal of the present invention according to a second exemplary embodiment.

FIG. 2 shows a second exemplary embodiment of brush seal 26 according to the present invention. FIG. 2 shows only rotor 12 and not the stator. To avoid unnecessary repetitions, the same reference numbers are used for the same components.

The exemplary embodiment of FIG. 2 differs from that of FIG. 1 by the fact that in the exemplary embodiment of FIG. 2, free ends 20 of bristles 16 rest or stand directly on peripheral surface 14 of rotor 12. Therefore, the gliding element present in FIG. 1 has been omitted in the exemplary embodiment of FIG. 2.

Another difference between the exemplary embodiment of FIG. 2 and the exemplary embodiment of FIG. 1 is that in the exemplary embodiment of FIG. 2 a positioning device 28 is situated on a lateral surface 27 of support element 23. Positioning device 28 is an integral part of plastic support element 23 and engages with a recess in the stator for secure mounting and to prevent twisting. According to FIG. 2, positioning device 28 projects beyond lateral surface 27 of support element 23 and extends in an essentially axial direction. In the exemplary embodiment of FIG. 1, positioning device 28 may of course also be situated on cover element 22. Positioning device 28 is referred to as a foolproof lug.

In the case of cover elements and support elements made of plastic, it is possible to integrate the positioning device into the same in a particularly simple and cost-effective way. Thus, for example, even asymmetrical geometries having complex, three-dimensional shape may be manufactured in injection-molded plastic parts in a simple and cost-effective manner. Such positioning device may thus be integrated onto the support element or the cover element made of injection-molded plastic without any noteworthy additional cost.

One common feature of both exemplary embodiments is that cover element 22 and support element 23, which form bristle housing 19, are manufactured of plastic. Therefore, the weight and cost reductions are achieved as desired in both exemplary embodiments. Brush seals 10 and 26 according to the present invention are particularly well suited for applications in explosion-proof areas, since no sparks are generated in contact with the plastic cover elements and plastic support elements. Another advantage is that plastic cover elements 22 and support elements 23 are not affected by corrosion or oxidation.

An exemplary embodiment of the present invention in which brush seal 10, 26 includes a core element 17 also made of plastic in addition to plastic cover element 22 and plastic support element 23 is particularly advantageous. In this case, core element 17 is preferably made of a composite plastic material. Plastic fibers, aramide fibers, or other synthetic fibers are preferably embedded in a plastic support material to form core element 17. It is, however, also conceivable to make clamping element 18 of plastic. The more components of brush seals 10 and 26 are manufactured of plastic, the greater the achievable weight savings.

Finally, it should also be pointed out that the area of application of a brush seal 10 or 26 in which at least cover element 22 and/or support element 23 is made of plastic, depends in particular on the temperature resistance of the plastic used. A plastic whose temperature resistance matches the specific application of the brush seal must be selected.

What is claimed is:

1. A brush seal for providing a non-hermetic seal between a first part and a second part, the brush seal comprising: a bristle housing having a cover element and a support element, wherein at least one of the cover element and the support element is made of plastic, a core element, a clamping element, and a plurality of bristles wound around the core element and secured onto the core element using the clamping element and wherein the support element and the cover element are joined together by at least one of an adhesive and a friction lock.

2. The brush seal as recited in claim 1, wherein the support element and the cover element are snapped together.

3. The brush seal as recited in claim 2, wherein the support element has at least one locking element engaging with a corresponding recess in the cover element.

4. The brush seal as recited in claim 2, wherein the cover element has at least one locking element engaging with a corresponding recess in the support element.

* * * * *